(12) United States Patent
Chen

(10) Patent No.: US 8,305,288 B2
(45) Date of Patent: Nov. 6, 2012

(54) ANTENNA MODULE

(75) Inventor: Liang-Wei Chen, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 583 days.

(21) Appl. No.: 12/543,716

(22) Filed: Aug. 19, 2009

(65) Prior Publication Data

US 2010/0060533 A1    Mar. 11, 2010

(30) Foreign Application Priority Data

Sep. 10, 2008  (TW) ................................. 97134680 A

(51) Int. Cl.
*H01Q 3/02*    (2006.01)
(52) U.S. Cl. .......... 343/882; 343/702; 343/906; 439/11; 439/131
(58) Field of Classification Search .................. 343/702, 343/882, 880, 906; 439/11, 131
See application file for complete search history.

(56) References Cited

U.S. PATENT DOCUMENTS

| | | | |
|---|---|---|---|
| 6,394,813 B1 * | 5/2002 | Stout et al. ...................... | 439/11 |
| 6,816,121 B1 * | 11/2004 | Cheng et al. ................... | 343/702 |
| 7,470,148 B1 | 12/2008 | Su et al. | |
| 7,530,823 B1 * | 5/2009 | Thornton et al. .............. | 439/136 |
| 7,586,460 B2 * | 9/2009 | Hunt et al. ..................... | 343/882 |
| 7,632,113 B2 * | 12/2009 | Finn .............................. | 439/131 |
| 2007/0144875 A1 | 6/2007 | Nagata | |
| 2011/0181489 A1 * | 7/2011 | Kim et al. ..................... | 343/906 |

FOREIGN PATENT DOCUMENTS

| | | |
|---|---|---|
| EP | 0224006 A1 | 6/1987 |
| EP | 1688977 A2 | 8/2006 |
| JP | 6162871 A | 6/1994 |
| TW | M324886 | 1/2008 |
| WO | WO-2008/026474 A1 | 3/2008 |

* cited by examiner

*Primary Examiner* — Tho G Phan
(74) *Attorney, Agent, or Firm* — Rabin & Berdo, P.C.

(57) ABSTRACT

An antenna module including a casing, a USB connecting end, an antenna, a key and a moving component is provided. The casing has a terminal end opposite to the USB connecting end and a hole located at the terminal end. The antenna is disposed in the casing near the terminal end. The key disposed in the casing has an enabling portion for enabling the key when being touched. The moving component disposed in the casing includes a contacting member and an actuating member. The contacting member has first and second ends and a pivotal portion. The pivotal portion is pivotally connected to the casing between the first and second ends. The actuating member exposed from the hole is for moving toward the USB connecting end. The first end is driven by the actuating member, so that the second end is rotated around the pivotal portion to touch the enabling portion.

6 Claims, 7 Drawing Sheets

ANTENNA MODULE

This application claims the benefit of Taiwan application Serial No. 97134680, filed Sep. 10, 2008, the subject matter of which is incorporated herein by reference.

BACKGROUND OF THE INVENTION

1. Field of the Invention

The invention relates in general to an antenna module, and more particularly to an antenna module having a key.

2. Description of the Related Art

Along with the popularity of the wireless network, many devices related to the wireless network are developed to meet a user's needs. Let an external wireless network component using a universal serial bus (USB) as a connecting end be taken as an example. A user can insert the USB connecting end of the wireless network component into a receptacle of an electronic device, so that the electronic device can communicate wirelessly with other electronic devices through an antenna inside the wireless network component.

Generally speaking, in order to avoid the transmission dead corner formed between the wireless network component and the electronic device affecting the transmission efficiency of the antenna when the wireless network component is inserted into the electronic device, the antenna is normally disposed away from the USB connecting end. Thus, when a key is disposed at the wireless network component, the key is normally disposed at a side of the wireless network component due to the disposition restriction of the antenna or the circuit board inside the wireless network component.

However, the USB connecting end is inserted into the receptacle in a particular direction, and the receptacles of the electronic device are normally stacked. When a number of the wireless network components are inserted into the stacked receptacles, the key located at the side of the wireless network component may be blocked by the other wireless network components and cannot be used. Thus, how to design an antenna module whose key is handy for the user to operate under the premise that the antenna is disposed away from the USB connecting end has become an imminent issue to manufacturers.

SUMMARY OF THE INVENTION

The present invention is directed to an antenna module. A key of the antenna module is enabled by a moving component exposed from a terminal end of a casing of the antenna module, so that the key can execute the corresponding function. Thus, under the premise that an antenna of the antenna module of the present invention is disposed away from the USB connecting end, a user still can enable the key through the moving component located at the terminal end despite a number of the antenna modules of the present invention are inserted into stacked receptacles through the USB connecting ends concurrently.

According to a first aspect of the present invention, an antenna module including a casing, a universal serial bus (USB) connecting end, an antenna, a key and a moving component is provided. The casing has a terminal end and a hole which is located at the terminal end. The USB connecting end is opposite to the terminal end. The antenna is disposed in the casing near the terminal end. The key is disposed in the casing and has an enabling portion. The enabling portion faces the USB connecting end is used for enabling the key when being touched. The moving component is disposed in the casing. The moving component includes a contacting member and an actuating member. The contacting member has a first end, a second end and a pivotal portion. The pivotal portion is pivotally connected to the casing and located between the first end and the second end. The second end and the enabling portion are spaced at an interval. The actuating member is exposed from the hole for moving toward the USB connecting end. The first end is driven by the moving actuating member, so that the second end is rotated around the pivotal portion to touch the enabling portion.

According to a second aspect of the present invention, an antenna module including a casing, a USB connecting end, an antenna, a key and a moving component is provided. The casing has a terminal end and a hole which is located at the terminal end. The USB connecting end is opposite to the terminal end. The antenna is disposed in the casing near the terminal end. The key is disposed in the casing and has an enabling portion. The enabling portion facing the terminal end is used for enabling the key when being touched. The moving component is disposed in the casing and has a pressing end and an acting end. The pressing end is opposite to the acting end. The pressing end is exposed from the hole. The acting end and the enabling portion are spaced at an interval. The moving component is used for moving toward the USB connecting end, so that the acting end touches the enabling portion.

According to a third aspect of the present invention, an antenna module including a casing, a USB connecting end, an antenna, a key and a moving component is provided. The casing has a terminal end and a hole which is located at the terminal end. The USB connecting end is opposite to the terminal end. The antenna is disposed in the casing near the terminal end. The key is disposed in the casing and has an enabling portion. The enabling portion facing the USB connecting end is used for enabling the key when being touched. The moving component is disposed in the casing and includes a contacting member and an actuating member. The contacting member is a U-shaped structure and has a first end and a second end. The first end and the second end face the terminal end. The second end and the enabling portion are spaced at an interval. The actuating member has a pressing end and an acting end. The pressing end is opposite to the acting end. The pressing end is exposed from the hole. The acting end is connected to the first end. The actuating member is used for moving toward the USB connecting end. The first end is driven by the moving actuating member, so that the second end is moved towards the terminal end to touch the enabling portion.

The invention will become apparent from the following detailed description of the preferred but non-limiting embodiments. The following description is made with reference to the accompanying drawings.

DETAILED DESCRIPTION OF THE INVENTION

The present invention provides an antenna module. Under the premises that an antenna is located at a terminal end of a casing and the terminal end is opposite to a USB connecting end, a moving component is disposed at the terminal end of the casing to enable a key of the antenna module. The antenna module of the present invention is disclosed below by some embodiments with accompanied drawings. However, the following disclosure is for elaboration only, not for limiting the scope of the present invention. Some components are omitted in the diagrams for highlight the technical features of the present invention.

First Embodiment

The present embodiment of the invention discloses an antenna module including a casing, a universal serial bus (USB) connecting end, an antenna, a key and a moving component. The casing has a terminal end and a hole which is located at the terminal end. The USB connecting end is opposite to the terminal end. The antenna is disposed in the casing near the terminal end, and both the key and the moving component are disposed in the casing. The key has an enabling portion facing towards the USB connecting end. The enabling portion is used for enabling the key when being touched. The moving component includes a contacting member and an actuating member. The contacting member has a first end, a second end and a pivotal portion. The pivotal portion is pivotally connected to the casing and located between the first end and the second end. The second end and the enabling portion are spaced at an interval. The actuating member exposed from the hole is used for moving toward the USB connecting end. The first end is driven by the moving actuating member, so that the second end is rotated around the pivotal portion to touch the enabling portion.

Two types of antenna modules are disclosed below with accompanied drawings, but the scope of the present invention is not limited thereto.

Figure 1A:
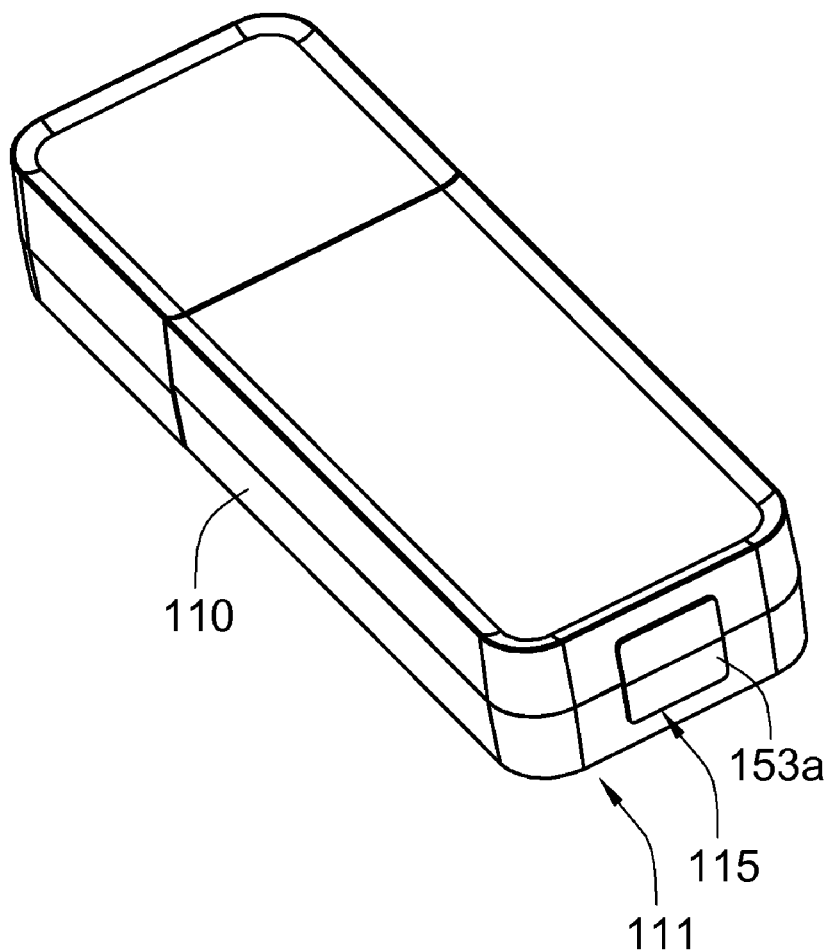
FIG. 1A shows an assembly diagram of an antenna module according to a first embodiment of the present invention.
Figure 1B:
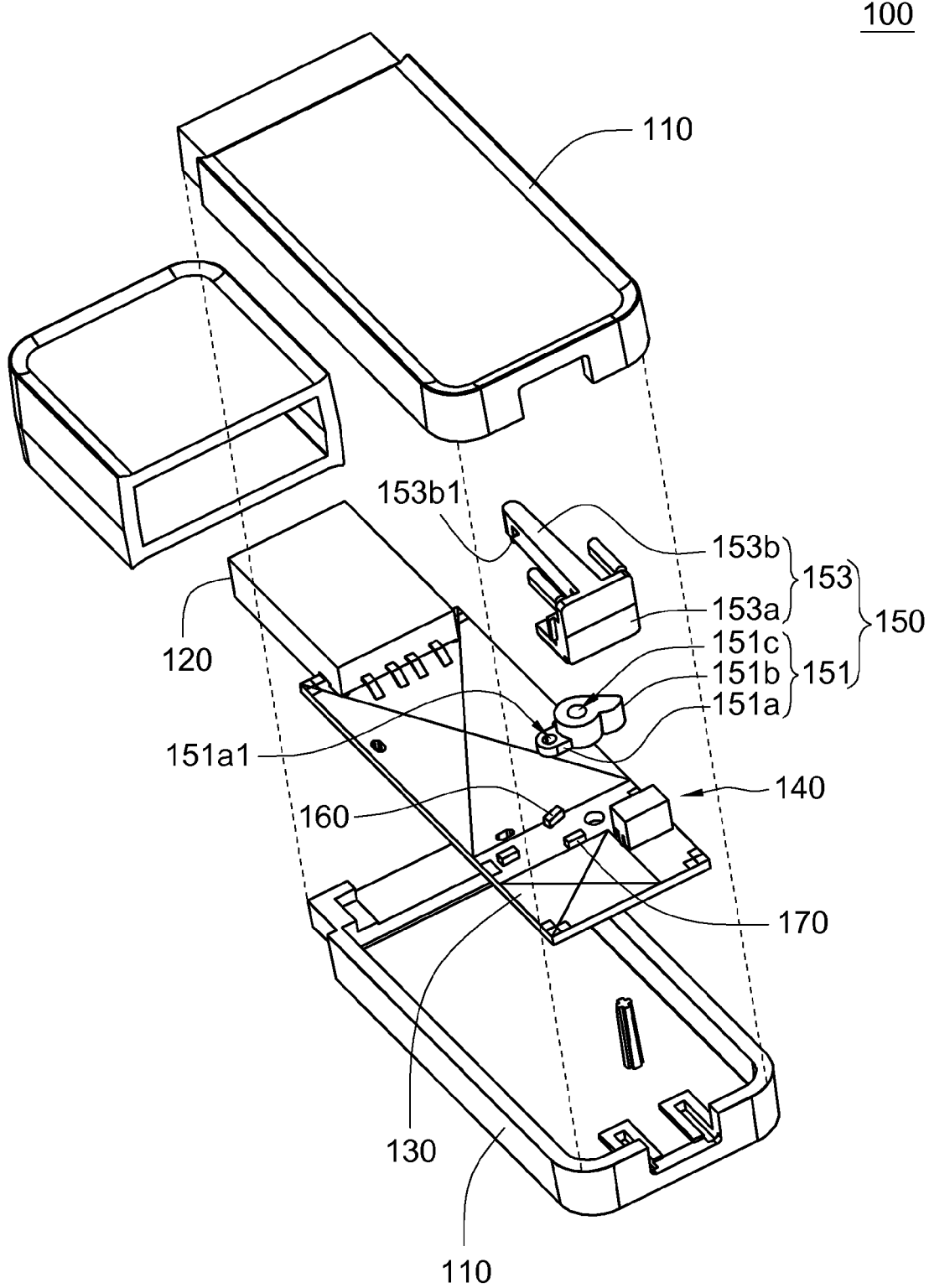
FIG. 1B shows an explosion diagram of the antenna module in FIG. 1A.
Figure 1C:
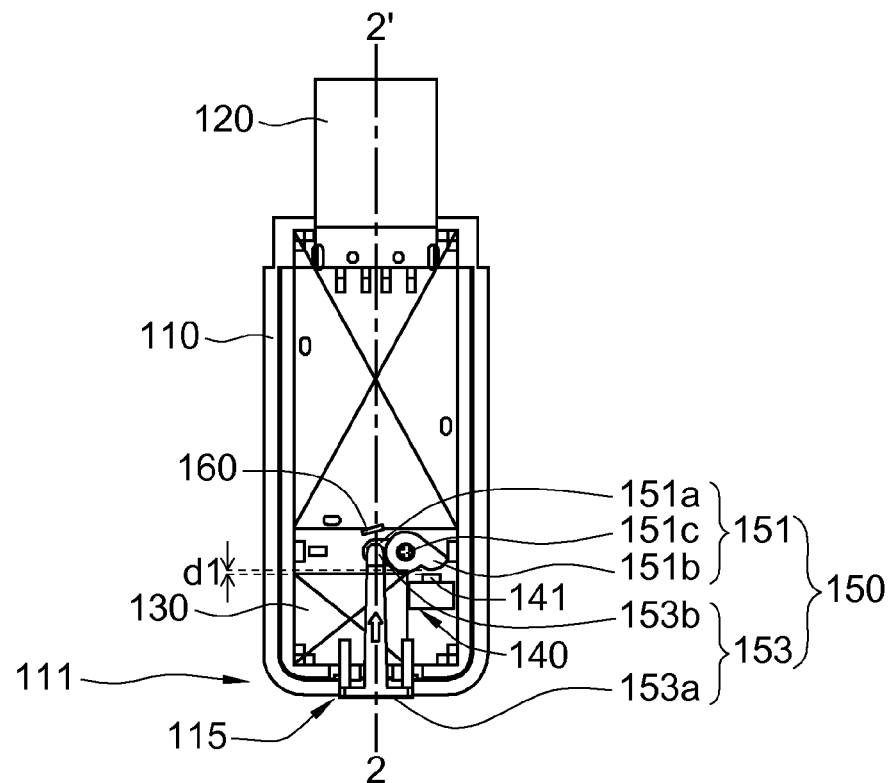
FIG. 1C shows a top view of the antenna module in FIG. 1A when being partially assembled.

Referring to FIG. 1A, FIG. 1B and FIG. 1C at the same time, an assembly diagram of an antenna module according to a first embodiment of the present invention is shown in FIG. 1A, an explosion diagram of the antenna module in FIG. 1A is shown in FIG. 1B, and a top view of the antenna module in FIG. 1A when being partially assembled is shown in FIG. 1C. The antenna module 100 includes a casing 110, a universal serial bus (USB) connecting end 120, an antenna 130, a key 140 and a moving component 150.

The casing 110 is constituted by two housings. Each housing has an indentation. When the two housings are assembled together, the two corresponding indentations form a hole 115 at the terminal end 111 of the casing 110 as indicated in FIG. 1A. The terminal end 111 is opposite to the USB connecting end 120. The type of the casing 110 is not limited to the one exemplified above, and any type of casing having a hole at the terminal end opposite to the USB connecting end can be used in the present embodiment of the invention. To further highlight the disposition of each components of the antenna module 100, only a part of the casing 110 is illustrated in FIG. 1C.

The antenna 130 is disposed in the casing 110. Preferably, in order to avoid transmission dead corner formed between the antenna module 100 and an electronic device affecting the transmission efficiency of the antenna 120 when the antenna module 100 is electrically connected to the electronic device through the USB connecting end 120, the antenna 130 is disposed in the casing 100 near the terminal end 111.

The key 140 is disposed in the casing 110 and has an enabling portion 141. The enabling portion 141 faces towards the USB connecting end 120 for enabling the key 140 when being touched so as to execute a function corresponding to the key 140. In the present embodiment of the invention, the function corresponding to the key 140 can be a function which is used for connecting a wireless network or resetting, but the function is not limited thereto. The function corresponding to the key 140 can be determined according to manufacturers' needs.

The moving component 150 is disposed in the casing 110 and includes a contacting member 151 and an actuating member 153. The contacting member 151 has a first end 151a, a second end 151b and a pivotal portion 151c. The pivotal portion 151c is pivotally connected to the casing 110 and located between the first end 151a and the second end 151b, so that the first end 151a and the second end 151b can be rotated around the pivotal portion 151c. The second end 151b and the enabling portion 141 of the key 140 are spaced at an interval d1. That is, under normal circumstances, the enabling portion 141 of the key 140 does not touch the second end 151b. The actuating member 153 has a pressing end 153a and an acting end 153b. The pressing end 153a is opposite to the acting end 153b, and the pressing end 153a is exposed from the hole 115.

The present embodiment is exemplified by the case that the acting end 153b of the actuating member 153 is pivotally connected to the first end 151a of the contacting member 151, and the way of pivotally connecting the acting end 153b of the actuating member 153 to the first end 151a of the contacting member 151 is disclosed below. The first end 151a of the contacting member 151 has a pivotal hole 151a1 (shown in FIG. 1B), and the acting end 153b of the actuating member 153 has a pivotal shaft 153b1 (shown in FIG. 1B). The pivotal shaft 153b1 is inserted into the pivotal hole 151a1 so as to pivotally connect the contacting member 151 to the actuating member 153. The way of pivotally connecting the contacting member 151 to the actuating member 153 is not limited to the exemplification here.

Figure 1D:
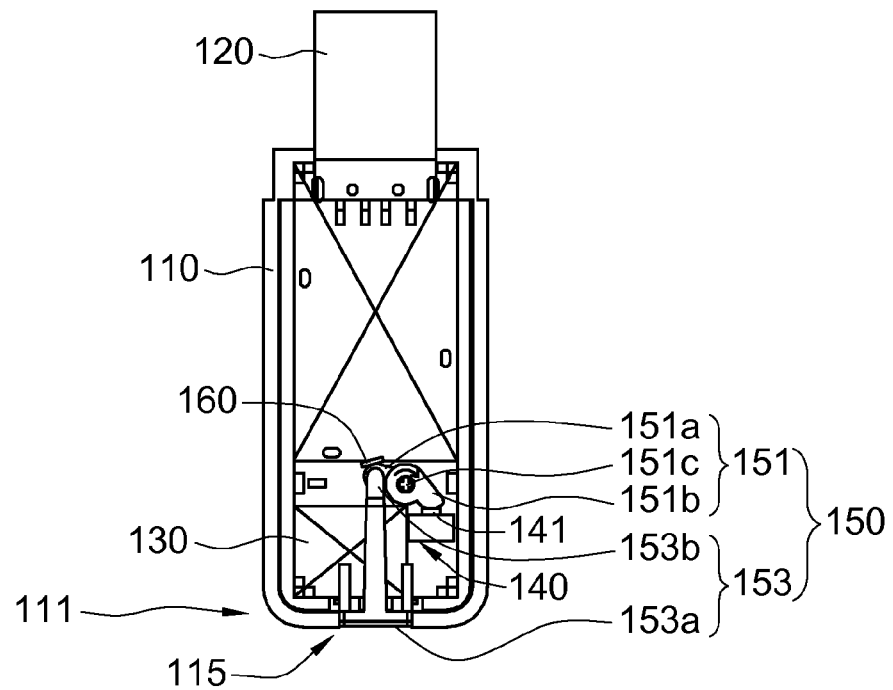
FIG. 1D shows the actuating member in FIG. 1C when being moved towards the USB connecting end.

As indicated in FIG. 1C, when the pressing end 153a of the actuating member 153 is pushed by a user to move towards the USB connecting end 120, the actuating member 153 pivotally connected to the contacting member 151 drives the first end 151a of the contacting member 151. Thus, as indicated in FIG. 1D, the second end 151b of the contacting member 151 is rotated around the pivotal portion 151c to touch the enabling portion 141 to enable the key 140. The function corresponding to the key 140, such as connecting to a wireless network or resetting, can be executed accordingly.

As the contacting member 151 is pivotally connected to the casing 110, the movement trace of the first end 151a of the contacting member 151 is similar to an arc, so that the movement of the pivotal shaft 153b1 inserted into the pivotal hole 151a1 of the first end 151a is also similar to an arc. Preferably, in order to make the actuating member 153 and the contacting member 151 move more smooth, the pivotal hole 151a1 in FIG. 1B is an ellipse, and the position of the pivotal hole 151a1 is determined according to the movement trace of the pivotal shaft 153b1.

Moreover, the antenna module 100 of the present embodiment of the invention can further include an elastic member and a light source. The design and the disposition of the antenna module 100 including an elastic member and a light source are disclosed below. However, anyone who is skilled in the art should understand that the disposition and the types of the elastic member and the light source are not limited to the following exemplifications.

In the present embodiment of the invention, the enabling portion 141 of the antenna module 100 enables the key 140 when being pressed, and the enabling portion 141 is reboundable, so that the enable portion 141 can restore to its original position after being pressed. After the enabling portion 141 is pressed by the second end 151b of the contacting member 151, the enabling portion 141 restores to the original position by an elastic force. Thus, the second end 151b of the contacting member 151 is pushed by the enabling portion 141 to drive the first end 151a to rotate around the pivotal portion 151c to the original position. As the first end 151a of the contacting member 151 is pivotally connected to the acting end 153b of the actuating member 153, when the first end 151a of the contacting member 151 is rotated to the original position, the acting end 153b of the actuating member 153 is pushed by the first end 151a of the contacting member 151 to move towards the terminal end 111. Therefore, the acting end 153b restores to the position as indicated in FIG. 1C from the position indicated in FIG. 1D.

In the present embodiment of the invention, in order to further ensure that the actuating member 153 can restore to the position indicated in FIG. 1C, the antenna module 100 can have an elastic member 160 disposed in the casing 110. The elastic member 160 is used for providing an elastic force to the actuating member 153, so that the actuating member 153 is moved towards the terminal end 111 to restore to its original position. In the present embodiment of the invention, as the actuating member 153 and the contacting member 151 are directly connected together, so the elastic member 160 can be disposed at a position corresponding to the contacting member 151. When the contacting member 151 restores to its original position by receiving the elastic force provided by the elastic member 160, the contacting member 151 concurrently drives the actuating member 153 to restore to its original position. The position, the type, and the quantity of the elastic member 160 or even the way of providing the elastic force to the actuating member 153 are not limited to the above exemplifications. For example, the elastic member can also be disposed at a position corresponding to the actuating member, so that the actuating member restores to the position as indicated in FIG. 1C by an elastic force and the contacting member is concurrently driven to restore to the position as indicated in FIG. 1C. Or, the antenna module can include two elastic members respectively corresponding to the actuating member and the contacting member. Thus, elastic forces are provided to the actuating member and the contacting member respectively so as to restore the actuating member and the contacting member to the position as indicated in FIG. 1C.

Figure 2:
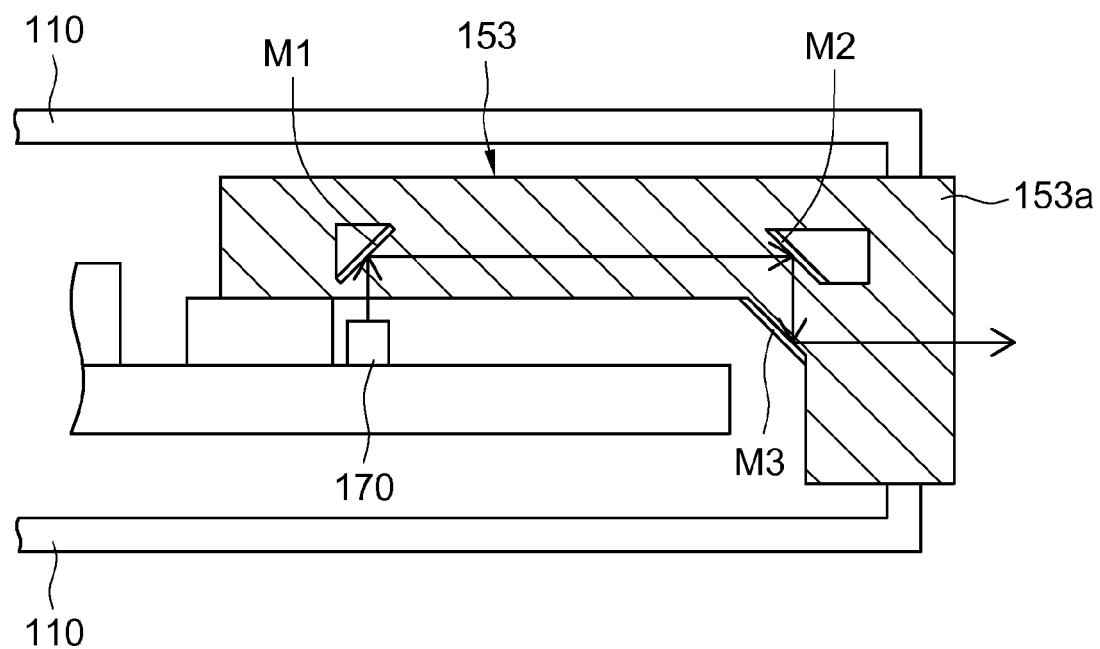
FIG. 2 shows a cross-sectional view of the antenna module in FIG. 1C taken along line 2-2'.

As for the disposition of the light source of the antenna module 100, referring to FIG. 2, a cross-sectional view of the antenna module in FIG. 1C taken along line 2-2' is shown. The light source 170, such as a light emitting diode (LED), is disposed in the casing 110 and located under the actuating member 153. The light source 170 is used for projecting the light into the actuating member 153, so that the light is guided to the outside of the casing 110 by the actuating member 153, as indicated by the arrows in FIG. 2.

For example, the actuating member 153 has three reflecting members M1, M2 and M3, and the normal direction of the reflecting surface of each reflecting members M1, M2 and M3 and the direction in which the light is projected to the actuating member 153 form an included angle of 45 degrees, for example. The reflecting member M1 is disposed above the light source 170 for guiding the light towards the reflecting member M2. The position of the reflecting member M2 corresponds to that of the reflecting member M1 for receiving the light from the reflecting member M1 and guiding the light towards the reflecting member M3. The position of the reflecting member M3 corresponds to those of the reflecting member M2 and the pressing end 153a for receiving the light from the reflecting member M2 and guiding the light towards the pressing end 153a. Preferably, the actuating member 153 is made of a transparent material, so that the light can pass through the actuating member 153 and be guided to the outside of the casing 110. When the light is projected outside the casing 110 through the pressing end 153a, the projecting area on the pressing end 153a is adjustable, and is not limited to the exemplification here.

As for the application of the light source 170, the light source 170 can be used for showing whether the key 140 is enabled by lighting or not, so that a user can understand whether the key 140 is enabled to execute the corresponding function according to the lighting status of the pressing end 153a. The application of the light source 170 is not limited to the above exemplifications. The light source 170 can also continually emit light with certain color under normal circumstances. When the key 140 is enabled, the light source 170 emits light with different color, so that a user can understand whether the key 140 is enabled according to the color change at the pressing end 153a.

Figure 3A:
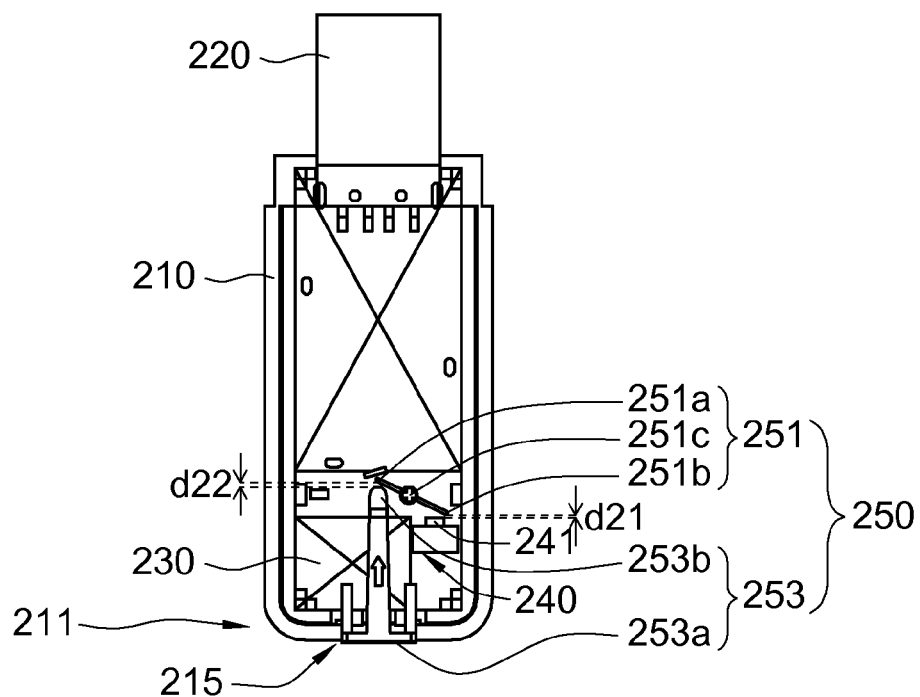
FIG. 3A shows a top view of the other antenna module according to the first embodiment of the present invention when being partially assembled.

One of the antenna modules according to the first embodiment of the present invention is disclosed above. Referring to FIG. 3A, a top view of the other antenna module according to the first embodiment of the present invention when being partially assembled is shown. Compared with the moving component 150 shown in FIG. 1C, the design of the moving component 250 in FIG. 3A is different from that of the moving component 150 in FIG. 1C.

As indicated in FIG. 3A, the antenna 230 of the antenna module is disposed in the casing 210 near the terminal end 211. The moving component 250 includes a contacting member 251 and an actuating member 253. The contacting member 251 has a first end 251a, a second end 251b and a pivotal portion 251c. The pivotal portion 251c is located between the first end 251a and the second end 251b and is pivotally connected to the casing 210. The second end 251b and the enabling portion 241 of the key 240 are spaced at an interval d21. That is, under normal circumstances, the enabling portion 241 of the key 240 does not touch the second end 251b.

The actuating member 253 has a pressing end 253a and an acting end 253b. The pressing end 253a is opposite to the acting end 253b, and the pressing end 253a is exposed from a hole 215 located at the terminal end 211 of the casing 210. The acting end 253b of the actuating member 253 and the first end 251a of the contacting member 251 are spaced at an interval d22. That is, under normal circumstances, the actuating member 253 is not directly coupled to the contacting member 251.

Figure 3B:
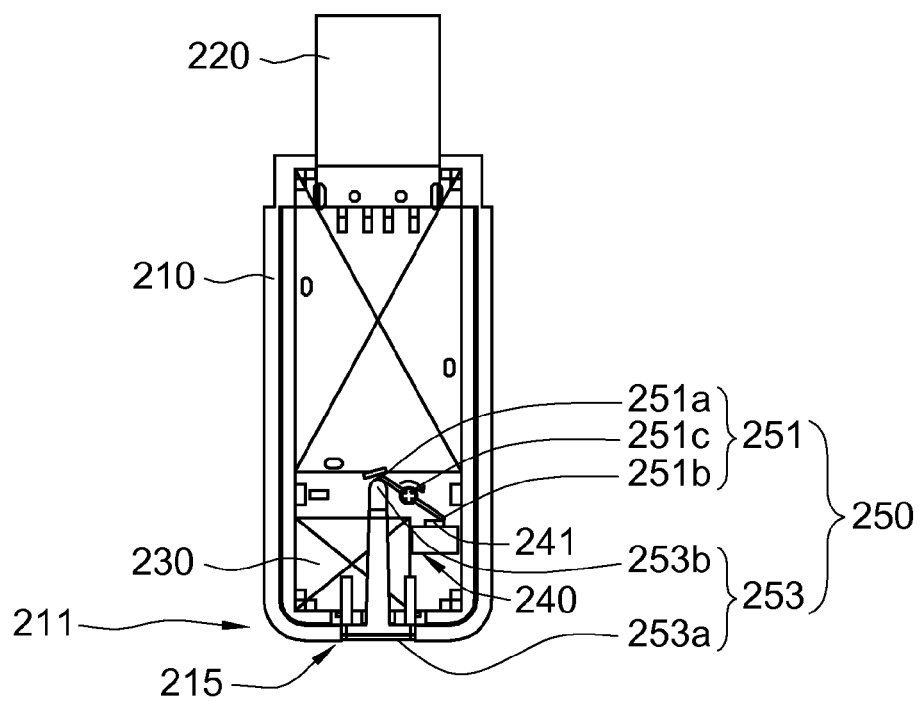
FIG. 3B shows the actuating member in FIG. 3A when being moved towards the USB connecting end.

As indicated in FIG. 3A, when the pressing end 253a of the actuating member 253 is pushed to move towards the USB connecting end 220, the acting end 253b of the actuating member 253 touches and pushes the first end 251a of the contacting member 251. Thus, as indicated in FIG. 3B, the second end 251b of the contacting member 251 is rotated around the pivotal portion 251c to touch the enabling portion 241 to enable the key 240. The function corresponding to the key 240, such as connecting to a wireless network or resetting, can be executed accordingly.

The antenna module in FIG. 3A and FIG. 3B can also be disposed with a light source or/and an elastic member so as to provide corresponding functions. The disposition and design of the two types of antenna modules disclosed above are only examples for elaboration, but not for limiting the scope of the present invention. Any implementation that the antenna of the antenna module is disposed at the terminal end of the casing, and the key is enabled from the terminal end of the antenna module so as to execute the function corresponding to the key can be used as one of the implementations of the present invention.

In the present embodiment of the invention, the antenna of the antenna module is disposed near the terminal end of the casing to avoid the signal transmitted by the antenna being affected by the transmission dead corner formed between the antenna module and an electronic device electrically connected thereto. In addition, the contacting member is driven by the actuating member disposed at the terminal end to enable the key. Thus, the antenna module of the present embodiment of the invention provides the design of disposing the antenna and the mechanism for enabling the key at the terminal end of the casing concurrently. Generally speaking, receptacles provided for the USB connecting end of the antenna module to be inserted therein are stacked at an electronic device. Compared with the antenna module in which the antenna is disposed at the terminal end of the casing and the key can only be disposed at the side of the casing, the antenna module of the present embodiment of the invention has the following advantages. Firstly, the antenna module of the present embodiment of the invention provides excellent quality in signal transmission. Secondly, despite a number of antenna modules of the present embodiment of the invention are inserted into stacked receptacles concurrently, the antenna module of the present embodiment of the invention still allows a user to conveniently enable the key through the moving component located at the terminal end, and the situation that the antenna module with the key at the side is likely blocked by other antenna modules can be avoided.

Second Embodiment

Compared with the antenna module of the first embodiment, the disposition of the key and the design of the moving component of the antenna module of the present embodiment of the invention are different from those of the antenna module of the first embodiment.

Figure 4A:
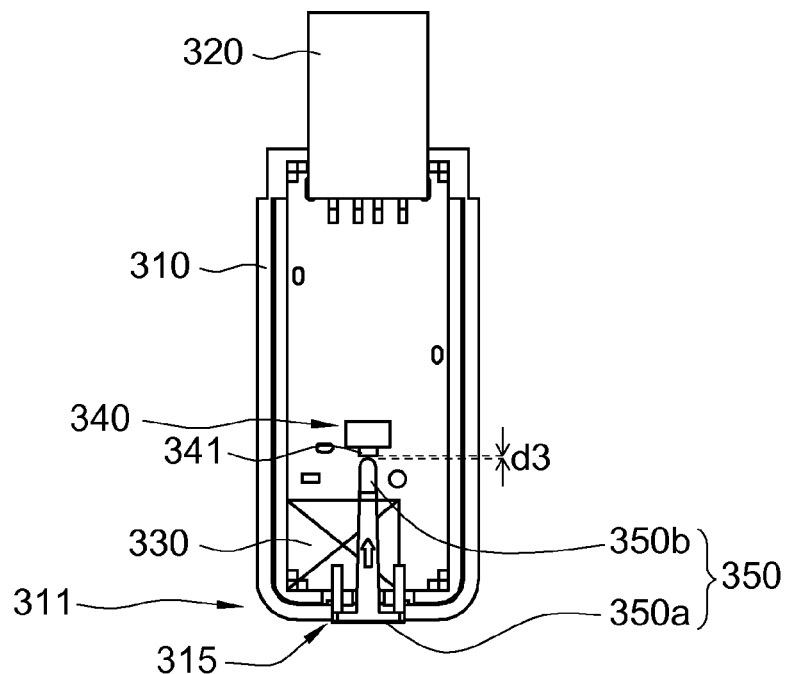
FIG. 4A shows a top view of an antenna module according to a second embodiment of the present invention when being partially assembled.

Referring to FIG. 4A, a top view of an antenna module according to a second embodiment of the present invention when being partially assembled is shown. The antenna 330 of the antenna module is disposed in the casing 310 near the terminal end 311. The key 340 and the moving component 350 are disposed in the casing 310. The key 340 has an enabling portion 341 facing the terminal end 311 of the casing 310 for enabling the key 340 when being touched. The moving component 350 has a pressing end 350a and an acting end 350b. The pressing end 350a is opposite to the acting end 350b, and the pressing end 350a is exposed from the hole 315 located at the terminal end 311. The acting end 350b and the enabling portion 341 are spaced at an interval d3. That is, under normal circumstances, the enabling portion 341 of the key 340 does not touch the acting end 350b.

Figure 4B:
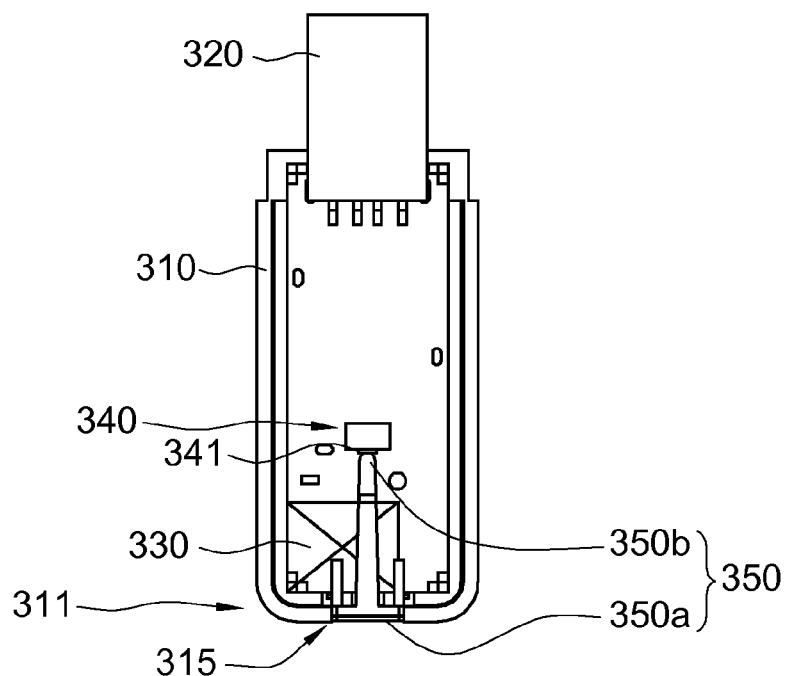
FIG. 4B shows the moving component in FIG. 4A when being moved towards the USB connecting end.

As indicated in FIG. 4A, when the pressing end 350a of the moving component 350 is pushed to move towards the USB connecting end 320 of the terminal end 311, the acting end 350b touches the enabling portion 341 (as indicated in FIG. 4B) to enable the key 340. The function corresponding to the key 340, such as connecting to a wireless network or resetting, can be executed accordingly.

The antenna module in FIG. 4A and FIG. 4B can further include a light source and an elastic member as indicated in the first embodiment according to the needs. The design of the light source and the elastic member is disclosed in the first embodiment, and is not repeatedly described herein. The disposition and design of the antenna module disclosed above are only an exemplification for elaboration, not for limiting the scope of the present invention. Any implementation that the antenna of the antenna module is disposed at the terminal end of the casing, and the key is enabled from the terminal end of the antenna module so as to execute the function corresponding to the key can be used as one of the implementations of the present invention.

In the present embodiment of the invention, the antenna of the antenna module is disposed near the terminal end of the casing to avoid the signal transmitted by the antenna being affected by the transmission dead corner formed between the antenna module and an electronic device electrically connected thereto. In addition, the contacting member is driven by the moving component disposed at the terminal end to enable the key. Thus, the antenna module of the present embodiment of the invention provides the design of disposing the antenna and the mechanism for enabling the key at the terminal end of the casing concurrently. Thus, despite a number of antenna modules of the present embodiment of the invention are inserted into the stacked receptacles concurrently, a user still can enable the key through the moving component located at the terminal end, and the situation that the antenna module with the key at the side is likely blocked by other antenna modules can be avoided.

Third Embodiment

Compared with the antenna module of the first embodiment, the design of the moving component of the antenna module of the present embodiment of the invention is different from that of the first embodiment.

Figure 5A:
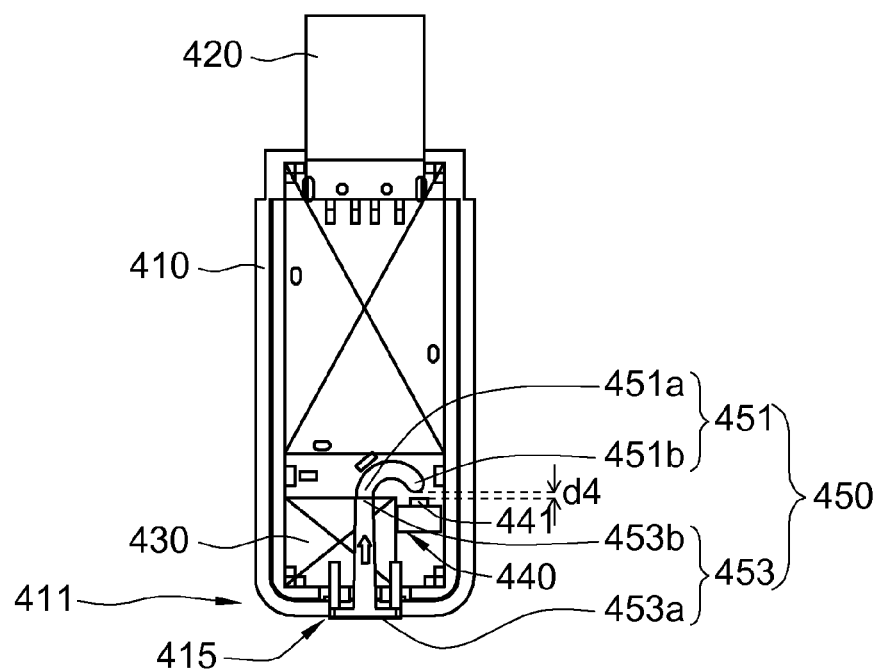
FIG. 5A shows a top view of an antenna module according to a third embodiment of the present invention when being partially assembled.

Referring to FIG. 5A, a top view of an antenna module according to a third embodiment of the present invention when being partially assembled is shown. The antenna 430 of the antenna module is disposed in the casing 410 near the terminal end 411. The key 440 and the moving component 450 are disposed in the casing 410. The key 440 has an enabling portion 441 facing the USB connecting end 412 for enabling the key when being touched 440. The USB connecting end 412 is opposite to the terminal end 411.

The moving component 450 includes a contacting member 451 and an actuating member 453. The contacting member 451 is a U-shaped structure and has a first end 451a and a second end 451b. The first end 451a and the second end 451b face the terminal end 411. The second end 451b and the enabling portion 441 are spaced at an interval d4. That is, under normal circumstances, the enabling portion 441 of the key 440 does not touch the second end 451b. The actuating member 453 has a pressing end 453a and an acting end 453b. The pressing end 453a is opposite to the acting end 453b, and the pressing end 453a is exposed from the hole 415. The acting end 453b of the actuating member 453 is connected to the first end 451a of the contacting member 451, and the contacting member 451 and the actuating member 453 can be integrally formed.

As indicated in FIG. 5A, when the pressing end 453a of the actuating member 453 is pushed to move towards the USB connecting end 420, the first end 451a of the contacting member 451 is driven by the acting end 453b, so that the second end 451b of the contacting member 451 is moved towards the enabling portion 441 to touch the enabling portion 441 and enable the key 440.

Figure 5B:
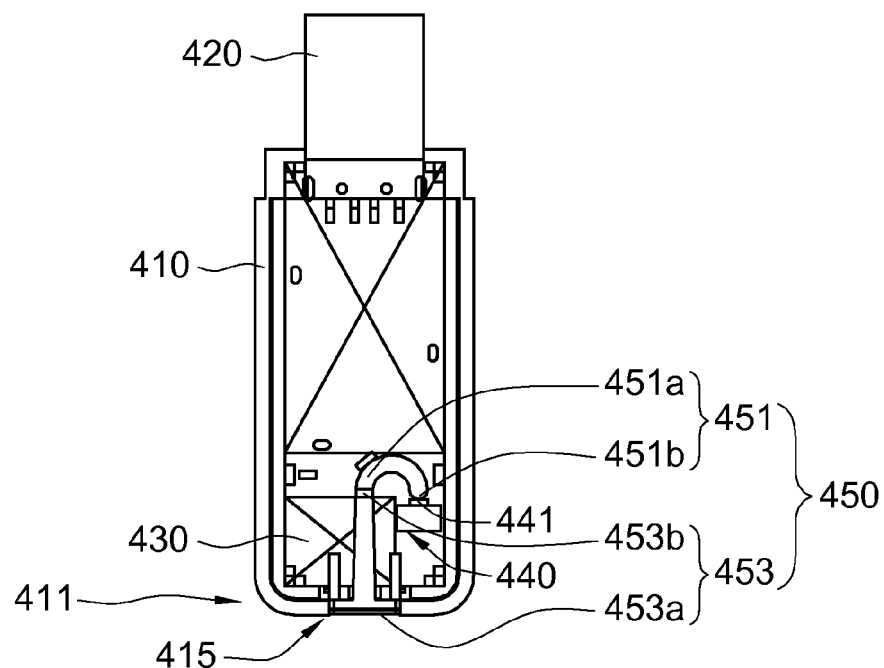
FIG. 5B shows the actuating member in FIG. 5A when being moved towards the USB connecting end.

The antenna module in FIG. 5A and FIG. 5B can further include a light source and an elastic member as indicated in the first embodiment according to the needs. The design of the light source and the elastic member is disclosed in the first embodiment, and is not repeatedly described herein. The disposition and design of the antenna module disclosed above are only an exemplification for elaboration, not for limiting the scope of the present invention. Any implementation that the antenna of the antenna module is disposed at the terminal end of the casing, and the key is enabled from the terminal end of the antenna module so as to execute the function corresponding to the key can be used as one of the implementations of the present invention.

According to the antenna module disclosed in the above embodiments of the invention, the key is enabled by the moving component disposed at the terminal end of the casing. As the antenna of the antenna module of the present embodiment of the invention is disposed at the terminal end of the casing, the transmission efficiency is improved. In addition, despite a number of antenna modules of the present embodiments are inserted into the stacked receptacles concurrently, the user still can conveniently enable the key through the moving component located at the terminal end, and the situation that the antenna module with the key at the side is likely blocked by other antenna modules can be avoided.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An antenna module, comprising:
    a casing having a terminal end and a hole, wherein the hole is located at the terminal end;
    a universal serial bus (USB) connecting end opposite to the terminal end;
    an antenna disposed in the casing near the terminal end;
    a key disposed in the casing and having an enabling portion, wherein the enabling portion facing the USB connecting end enables the key while being touched; and
    a moving component disposed in the casing, wherein the moving component comprises:
        a contacting member having a first end, a second end and a pivotal portion, wherein the pivotal portion is pivotally connected to the casing and located between the first end and the second end, and the second end and the enabling portion are spaced at an interval; and
        an actuating member exposed from the hole for moving towards the USB connecting end, wherein the first end is driven by the moving actuating member, so that the second end is rotated around the pivotal portion to touch the enabling portion.

2. The antenna module according to claim 1, wherein the actuating member has a pressing end and an acting end, the pressing end is opposite to the acting end, the pressing end is exposed from the hole, and the first end of the contacting member is pivotally connected to the acting end of the actuating member.

3. The antenna module according to claim 2, wherein the first end of the contacting member has a pivotal hole, the acting end of the actuating member has a pivotal shaft inserted into the pivotal hole, and the pivotal hole is elliptical.

4. The antenna module according to claim 1, wherein the actuating member has a pressing end and an acting end, the pressing end is opposite to the acting end, the pressing end is exposed from the hole, and the first end of the contacting member and the acting end of the actuating member are spaced at another interval.

5. The antenna module according to claim 1, further comprising:
    a light source disposed in the casing and located under the actuating member, wherein the light source projects light into the actuating member, and the actuating member guides the light to the outside of the casing.

6. The antenna module according to claim 1, further comprising:
    an elastic member disposed in the casing for providing an elastic force, so that the actuating member is moved towards the terminal end.

* * * * *